United States Patent

Matumoto

[15] 3,686,766
[45] Aug. 29, 1972

[54] DIGITAL MICROMETER
[72] Inventor: Sakuzo Matumoto, Tokyo, Japan
[73] Assignee: Olympus Optical Co., Ltd., Tokyo, Japan
[22] Filed: June 9, 1970
[21] Appl. No.: 44,739

[30] Foreign Application Priority Data

Feb. 4, 1970 Japan ..................45/31688

[52] U.S. Cl. ..............................................33/166
[51] Int. Cl. ............................................G01b 3/18
[58] Field of Search..............................33/166, 163

[56] References Cited

UNITED STATES PATENTS 3,482,321 12/1969 Inshaw..........................33/166
3,514,865 6/1970 Karahashi.....................33/166
3,120,061 2/1964 Pfleiderer.....................33/166

Primary Examiner—Harry N. Haroian
Attorney—Otto John Munz

[57] ABSTRACT

Digital micrometer having an encoder rotor and an encoder stator. The encoder stator is fixedly secured to the micrometer which the encoded rotor is rotatably mounted in the micrometer but is prevented from moving axially so as to cooperate with the stator. The rotation of the rotor is correlated to the axial movement of a lead screw for the measurement through a thimble so that the measured value is obtained by the cooperation of the rotor with the stator.

6 Claims, 2 Drawing Figures

INVENTOR
SAKUZO MATUMOTO

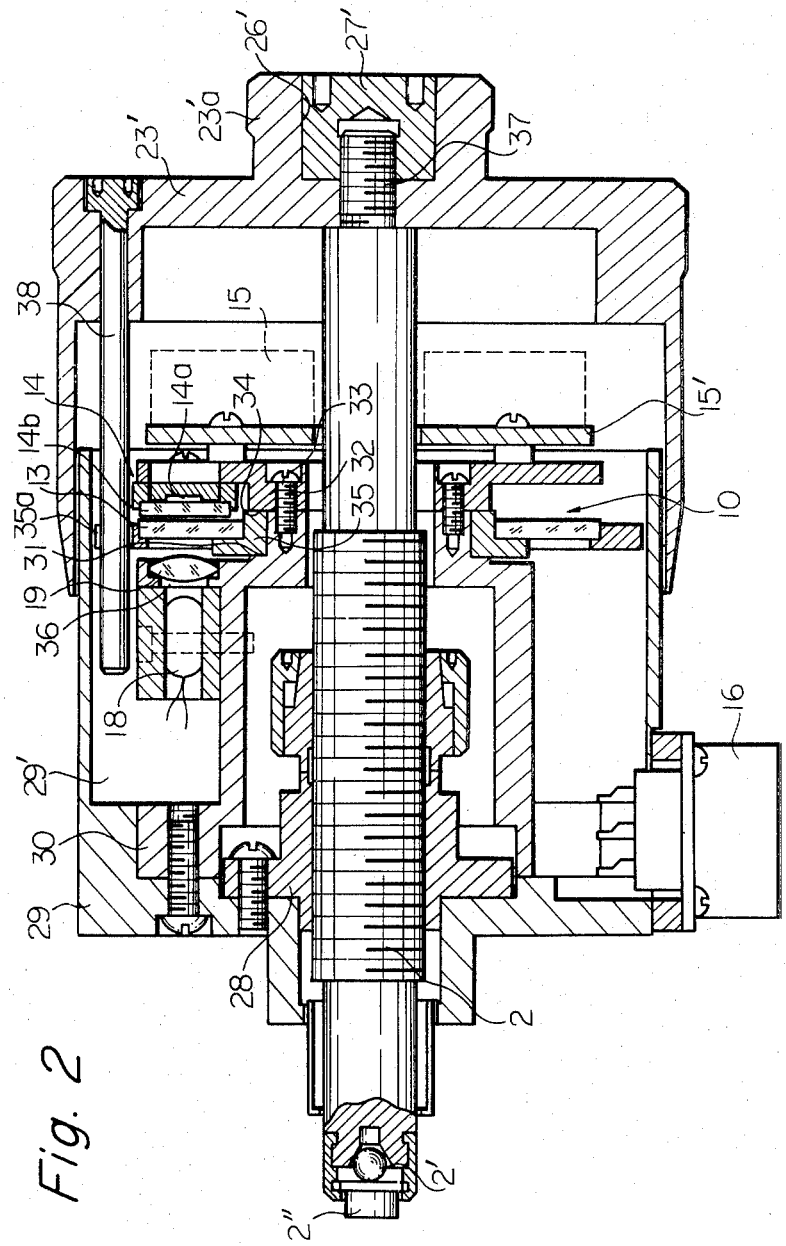

DIGITAL MICROMETER

BACKGROUND OF THE INVENTION

The present invention relates to a digital micrometer having an encoder rotor and an encoder stator.

In the prior art digital micrometer, it has been proposed to mount the encoder rotor and the encoder stator axially movably together with the measuring lead screw with the screw and the rotor being rotated together while the stator is prevented from rotating so that the rotational movement of the rotor relative to the stator is detected by the stator which relates to the axial movement of the lead screw in the measuring operation thereby permitting the measured value to be obtained by the cooperation of the encoder stator with the encoder rotor.

However, the mechanism in the prior art digital micrometer for axially moving the rotor and stator together with the measuring lead screw with the rotor and the screw being rotated together while the stator is prevented from rotating is necessarily very complicated in construction and is, therefore, expensive while it is difficult to maintain a high accuracy in the measuring operation due to the complicated construction of the mechanism and the durability is necessarily deteriorated.

The present invention aims at avoiding the disadvantages of the prior art digital micrometer.

SUMMARY OF THE INVENTION

An object of the present invention is to provide a novel and useful digital micrometer which avoids the above described disadvantages of the prior art digital micrometer.

Another object of the present invention is to provide a novel and useful digital micrometer of the type described above in which the encoder stator is held stationarily in the micrometer while the encoder rotor is rotated but is prevented from moving axially so as to maintain the proper axial position with respect to the stator during the movement of the lead screw for the measurement.

In accordance with one feature of the present invention, the measuring lead screw is moved axially but is prevented from rotating while the axial movement of the screw causes the rotor to be correspondingly rotated while the axial movement thereof is prevented so that the measured value is obtained by the cooperation of the stationary stator with the rotated rotor.

In accordance with another feature of the present invention, the screw is rotated and axially moved while the rotor is rotated together with the screw but is prevented from moving axially so that the measured value is obtained by the cooperation of the stationary stator with the rotated rotor.

The digital micrometer constructed in accordance with the one feature of the present invention is characterized by the screw axially movably but non-rotatably fitted in a main barrel and the encoder fixedly secured coaxially to the main barrel with an axial clearance provided therebetween in which the encoder rotor is rotatably mounted so that the rotor is prevented from moving axially, a thimble being fixedly secured to the rotor for the rotation therewith, the thimble being threadedly engaged with the lead screw so that the screw is moved axially by the rotation of the thimble for the measuring operation while the rotor is rotated together with the thimble. Since the rotation of the rotor is related to the axial movement of the lead screw through the thimble, the measured value is obtained by the cooperation of the rotor with the stator.

The thimble may be provided with a coaxial opening having a diameter larger than that of the screw thereby allowing the passage of the screw therethrough so that the range of measurement can be enlarged by replacing the screw by another lead screw having the desired length for the measurement.

The digital micrometer constructed in accordance with another feature of the present invention is characterized by the lead screw threadedly engaged with a main barrel so as to be moved axially as the screw is rotated and the thimble fixedly secured to the screw for the rotation and axial movement therewith, the encoder stator being fixedly secured to the barrel with an axial clearance provided therebetween in which the encoder rotor is rotatably mounted thereby preventing the rotor from moving axially, the rotor being provided with a recess at the peripheral portion thereof in which an axially extending guide pin fixedly secured to the thimble slidably engages so that the rotor is rotated by the rotation of the thimble while the axial movement of the rotor is prevented and the lead screw is rotated and axially moved together with the thimble. Since the rotation of the rotor is related to the axial movement of the screw through the thimble, the measured value is obtained by the cooperation of the rotor with the stator.

Since the digital micrometer of the present invention is very simple in construction as described above, a high accuracy in the measuring operation is insured and the durability is improved while it can be produced at a low cost.

BRIEF DESCRIPTION OF THE DRAWINGS

FIG. 2 is a view similar to FIG. 1 but showing the second embodiment of the present invention.

DETAILED DESCRIPTION OF THE PREFERRED EMBODIMENTS

Figure 1:
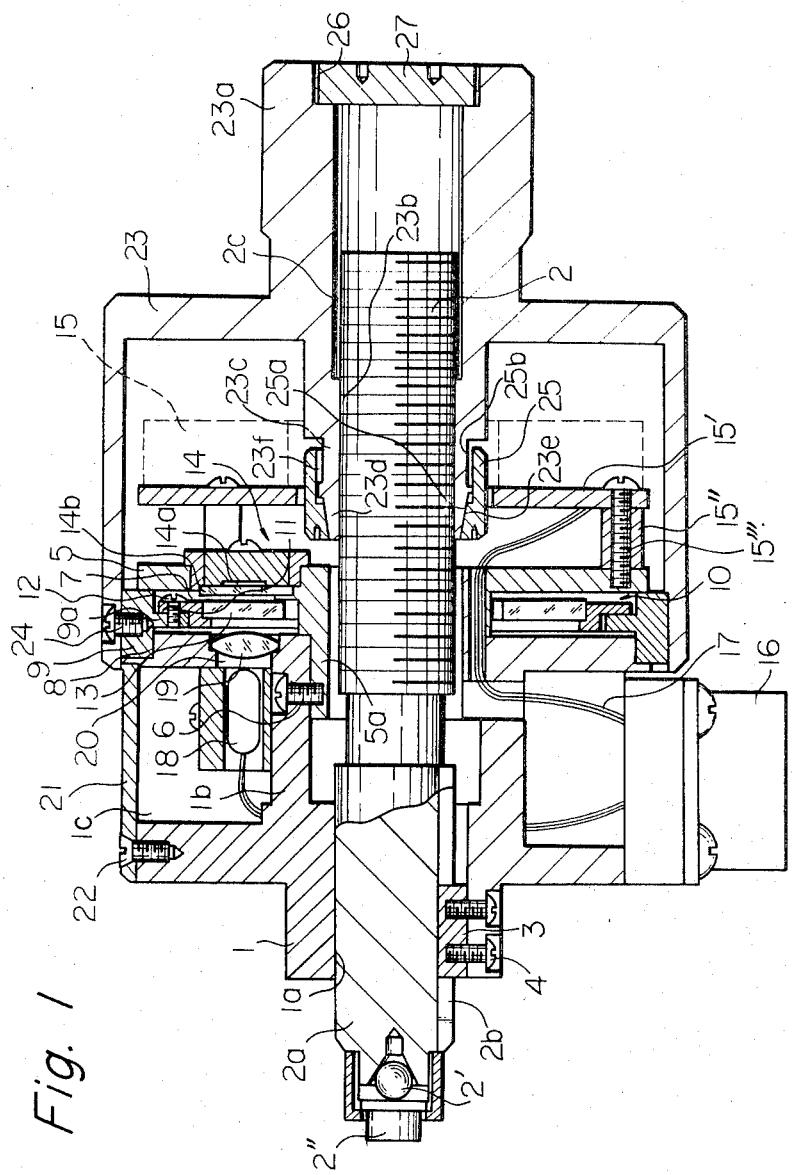
FIG. 1 is a longitudinal section view showing the first embodiment of the present invention.

Referring to FIG. 1, a main barrel 1 is provided with a through hole 1a in which cylindrical portion 2a of measuring lead screw 2 slidably fitted. A longitudinal key groove 2b is formed in portion 2a of screw 2 in which a key 3 fixedly secured to barrel 1 by means of set screws 4 is slidably fitted so that portion 2a and, hence, lead screw 2 are axially moved but are prevented from rotating. In the conventional manner, a ball 2' and a measuring terminal piece 2'' are provided at the end of lead screw 2 as shown. Barrel 1 is provided with a cylindrical flange 1b to which cylindrical flange 5a of encoder stator 5a of encoder stator 5 is fixedly secured by means of set screws 6 (one of which is illustrated) with an axial clearance 7 being provided between barrel 1 and stator 5. An annular shoulder 8 is formed in the outer periphery of barrel 1 at the inner end thereof, and an annular ring 9 forming a part of an encoder rotor 10 is rotatably engaged with shoulder 8 and sandwiched between barrel 1 and stator 5 so that ring 9 is allowed to be rotated while it is prevented from moving axially. An annular disc 11 is located in clearance 7 and is fixedly secured to the inwardly projecting annular flange 9a of ring 9 by means of set screws 12 on which a code disc 13 is fixedly mounted, so that code disc 13 is rotated together with ring 9 but is prevented from moving axially.

In the conventional manner, code disc 13 is provided thereon with a plurality of indicia such as slots in this embodiment in a circular array coaxial with the axis of rotation of code disc 13 and detecting means 14 for sensing the indicia of code disc 13 is provided in stator 5. In the conventional manner, detecting means comprises at least a sensing element such as a photoelectric transducer 14a and an indicia bearing disc 14b cooperating with code disc 13 for reading the encoding by code disc 13. The output of photoelectric transducer 14A is supplied to an amplifier 15 secured to base plate 15' which is in turn secured to stator 5 by distance pieces 15'' and set screws 15''' and the output of amplifier 15 is lead to connector 16 through lead wires 17 in the conventional manner.

As seen in FIG. 1, at least an illuminating source 18 is located in annular recess 1c in barrel 1 at a position corresponding to the indicia of code disc 13 and a collimator lens 19 is located in a hole 20 formed in barrel 1 in alignment with illuminating source 18, so that the light from illuminating source 18 passes through collimator lens 19 and the slots in code disc 13 and is incident to detecting means 14 in stator 5 for detecting the movement of code disc 13 relative to detecting means 14. A cylindrical cover plate 21 is fixed on the outer periphery of barrel 1 by set screws 22 to protect the interior 1c of barrel 1. Connector 16 is secured to cover plate 21 as shown.

As seen in FIG. 1, the outer diameter of ring 9 is made slightly greater than that of stator 5 and a cap-shaped thimble 23 having knob portion 23 is fixedly secured at its open end to the outer periphery of ring 9 by means of set screws 24 so that ring 9 is rotated together with thimble 23 when the same is rotated manually or by an electric motor (not shown) while the axial movement of ring 9 as well as thimble 23 is prevented.

In order to correlate the rotation of the encoder rotor comprising code disc 13 to the axial movement of lead screw 2, thimble 23 is formed with internal thread 23b in cylindrical flange portion 23c which threadedly engages with threaded portion 2c of lead screw 2 so that screw 2 is axially moved as thimble 23 is rotated together with code disc 13, since screw 2 is prevented from rotating by key 3 engaging with key slot 2b.

Inner end portion 23d of cylindrical flange 23c is provided with longitudinal slots (not shown) and tapered outer peripheral portion 23e with which mating tapered inner peripheral surface 25a of sleeve 25 is engaged and internal thread 25b of sleeve 25 is threaded engaged with thread 23f of the outer periphery of cylindrical flange 23c so that the backlash between thread 2c of screw 2 and thread 23b of thimble 23 is eliminated by appropriately rotating and setting sleeve 25.

Knob portion 23a of thimble 25 may be provided with an opening 26 coaxial with screw 2 and having the diameter greater than that of screw 2 so that screw 2 can be replaced by another screw having a greater length which passes through opening 26 when it is required to increase the range of measurement.

Opening 26 is usually closed by a cover 27 threadedly engaged in opening 26.

In operation, when thimble 23 is rotated to axially move screw 2 for the measurement, code disc 13 is rotated together with thimble 23 relative to detecting means 14 the amount of the rotation of which is precisely correlated to the amount of axial movement of screw 2 so that the measured value is obtained by the cooperation of code disc 13 with detecting means 14 as in the case of the conventional digital micrometer. As described above, the construction of the digital micrometer of the present invention is very simple thereby making it possible to manufacture the same at a low cost while a high accuracy and a long life are insured due to its simple construction.

Also, as described previously, the range of measurement can be enlarged by replacing the lead screw by another lead screw having the desired length for the measurement.

FIG. 2 shows another embodiment of the present invention. In this embodiment, the encoder rotor is rotated but is prevented from moving axially as in the case of the embodiment of FIG. 1, but the lead screw is axially moved as well as rotated together with the thimble fixedly secured thereto, and the encoder rotor is rotated by an axially extending guide pin secured to the thimble and slidably engaging with a recess formed in the encoder. The operation of the embodiment of FIG. 2 is similar to that of the embodiment of FIG. 1.

In FIG. 2, the main barrel is comprised of members 28, 29 and 30 secured together by set screws as shown. Member 29 forms a cylindrical wall protecting the interior of the micrometer. Member 30 is formed with annular shoulder 31 and stator 32 is secured to the inner end of member 30 by set screws 33 so that opposing shoulder 34 is formed by member 30 and stator 32 as shown. Rotor disc 35 of encoder rotor 10 is rotatably supported on member 30 between shoulder 31 and 34 while it is prevented from moving axially. Code disc 13 is secured to rotor disc 35 in like manner as in the case of FIG. 1. Detecting means 14, illuminating source 18 and collimator lens 19 are mounted on stator 32, in hollow portion 29' in member 29, and in opening 36 in member 30, respectively, in like manner as in the case of FIG. 1.

Measuring lead screw 2 is threadedly engaged with member 28 forming the barrel and thimble 23' is fixedly secured to the outer end of screw 2 by the engagement of threaded portion 37 of screw 2 with the thread of cover 27' fitting in opening 26' in knob portion 23'a of thimble 23' so that screw 2 is rotated and axially moved together with thimble 23' as the same is rotated manually or by means of an electric motor (not shown).

In order to correlate the rotation and axial movement of screw 2 with the rotation of encoder rotor 10, an axially extending guide pin 38 is fixedly secured to thimble 23' and a recess 35a is formed in rotor disc 35 at its peripheral portion and guide pin 38 is slidably fitted in recess 35a. Thus, rotor disc 35 is rotated by the rotation of thimble 23' while the axial movement of rotor disc 35 is prevented.

The operation of the embodiment of FIG. 2 is substantially similar to that of FIG. 1.

I claim:

1. A digital micrometer having a stationary main barrel, a measuring lead screw movably located coaxially in said barrel, a cap-shaped thimble for actuating said screw, an encoder rotor mounted on said barrel non-shiftably and rotatably coaxially with respect to said barrel and having a code disc provided with a plurality of indicia distributed in a circular array coaxially with said rotor, and an encoder stator including detecting means for detecting the movement of said indicia relative to said detecting means, said screw being provided with a portion which is axially movable but non-rotatably fitted in said barrel so that said screw is moved axially while the rotation of said screw is prevented and said encoder stator is fixedly secured coaxially to said barrel with an axial clearance being provided therebetween, said encoder rotor being rotatably supported by said barrel and said stator within said clearance with the outer peripheral portion of said rotor projecting beyond the outer periphery of said stator thereby preventing said encoder rotor from moving axially, said thimble being fixedly secured to said encoder rotor at the outer peripheral portion thereof for the rotation therewith while said thimble is threadedly engaged with said lead screw so that said screw is moved axially as said encoder rotor is rotated by said thimble.

2. A digital micrometer according to claim 1, wherein said thimble is formed with an opening coaxial with said screw and having a diameter larger than that of said screw so that the range of measurement can be varied by replacing said lead screw by another lead screw having a desired length.

3. A digital micrometer according to claim 1, wherein said detecting means comprises at least a photoelectric transducer and said indicia are transparent slots formed in said code disc.

4. A digital micrometer having a main barrel, a measuring lead screw threadedly engaged coaxially with said barrel, a cap-shaped thimble fixedly secured to said screw for the rotation and axial movement therewith, an encoder rotor rotatable coaxially with respect to said barrel and having a code disc provided with a plurality of indicia distributed in a circular array coaxially with said rotor, and an encoder stator including detecting means for detecting the movement of said indicia relative to said detecting means, wherein the improvement comprises the fact that said encoder stator is fixedly secured to said barrel with an axial clearance being provided therebetween, said encoder rotor being rotatably supported by said barrel and sad stator within said clearance thereby preventing said rotor from moving axially said encoder rotor being formed with a recess in the outer peripheral portion thereof, an axially extending guide pin fixedly secured to said thimble slidably engaging with said recess thereby permitting said encoder rotor to be rotated by said thimble together with said screw.

5. A digital micrometer according to claim 4, wherein said detecting means comprises at least a photoelectric transducer and said indicia are transparent slots formed in said code disc.

6. A digital micrometer comprising:
a stationary barrel;
an encoder stator secured to said stationary barrel fixedly and coaxially with an axial clearance therebetween;
a measuring lead-screw coaxially located within said barrel and having a portion axially moveable non-rotatably fitted within said barrel;
an encoder rotor mounted on said barrel non-shiftably and coaxially rotatably supported by said barrel and said stator within said clearance and with its outer periphery projecting beyond the outer periphery of said stator;
a cap shaped thimble with means engaging it threadedly with said lead screw for actuation thereof, fixedly secured to said encoder rotor at the outer periphery thereof for rotation therewith;
whereby said spindle rotates only when coupled with said rotor, thereby ensuring a high accuracy of operation.

* * * * *

UNITED STATES PATENT OFFICE
CERTIFICATE OF CORRECTION

Patent No. 3,686,766　　　　　　　Dated August 29, 1972

Inventor(s) Sakuzo Matumoto

It is certified that error appears in the above-identified patent and that said Letters Patent are hereby corrected as shown below:

On the cover sheet [30] the priority date should read -- April 2, 1970 --.

Signed and sealed this 19th day of December 1972.

(SEAL)
Attest:

EDWARD M. FLETCHER, JR.　　　　　ROBERT GOTTSCHALK
Attesting Officer　　　　　　　　Commissioner of Patents